United States Patent [19]
Mottino

[11] Patent Number: 5,284,282
[45] Date of Patent: Feb. 8, 1994

[54] DEVICE FOR LOADING, UNLOADING AND CARRYING BICYCLES ON MOTOR VEHICLE ROOFS PROVIDED WITH A PAIR OF CARRIER RAILS

[75] Inventor: Alessandro Mottino, Chieri, Italy

[73] Assignee: Almas s.r.l., Almese, Italy

[21] Appl. No.: 917,818

[22] Filed: Jul. 21, 1992

[30] Foreign Application Priority Data

Mar. 30, 1992 [IT] Italy .............. T092A000286

[51] Int. Cl.$^5$ ................................ B60R 9/10
[52] U.S. Cl. .................... 224/310; 224/314; 224/319; 224/42.45 R; 414/462
[58] Field of Search ................ 224/280–282, 224/309, 310, 314, 315, 317, 319–326, 329–331, 42.03 B, 42.45 R, 42.46 R; 211/17, 20–22; 414/462

[56] References Cited

U.S. PATENT DOCUMENTS

| | | | |
|---|---|---|---|
| 4,345,705 | 8/1982 | Graber | 224/42.03 B |
| 4,442,961 | 4/1984 | Bott | 224/42.03 B |
| 4,524,893 | 6/1985 | Cole | 224/319 |
| 4,728,244 | 3/1988 | Stokkenoal | 414/462 |
| 4,733,810 | 3/1988 | Graber et al. | 224/329 |
| 5,042,705 | 8/1991 | Johansson | 224/315 |
| 5,190,195 | 3/1993 | Fulhart et al. | 224/42.03 B |

FOREIGN PATENT DOCUMENTS

| | | | |
|---|---|---|---|
| 3335173 | 4/1985 | Fed. Rep. of Germany | 224/310 |
| 1333935 | 6/1963 | France | 414/462 |
| 1441036 | 4/1966 | France | 414/462 |
| 8302755 | 8/1983 | PCT Int'l Appl. | 224/310 |

*Primary Examiner*—J. Casimer Jacyna
*Attorney, Agent, or Firm*—Helfgott & Karas

[57] ABSTRACT

A device for loading, unloading and carrying a bicycle in an upright position on a motor vehicle roof provided with a pair of transverse carrier rails, comprising a shaped tube having its base pivotally connected to a support fastened to a first carrier rail, adapted to be rotated in a continuous manner from a lowered position for the engagement or disengagement of the bicycle frame, to a raised position for transporting the bicycle. There are further provided means for supporting and securing bicycle front wheel and bicycle frame, that are fastened to the second carrier bar and to the free end of the tube, respectively.

8 Claims, 4 Drawing Sheets

DEVICE FOR LOADING, UNLOADING AND CARRYING BICYCLES ON MOTOR VEHICLE ROOFS PROVIDED WITH A PAIR OF CARRIER RAILS

BACKGROUND OF THE INVENTION

1. Field of the Invention

The present invention relates to a device for loading, unloading and carrying a bicycle on a motor vehicle roof provided with a rack or structure for carrying articles, formed by a pair of transverse anchoring rails.

2. Background Information

There are known several devices for uprigthly carrying bicycles provided with a frame having a horizontal upper tube, such as racing bicycles or those known as "mountain bikes", on motor vehicle roofs, such devices usually comprising fastening members having various shapes and sizes, adapted to firmly secure bicycle frame and front wheel to a supporting structure fastened in turn to the roof edge, or to the drip moulding in case the motor vehicle is so equipped.

The operations of positioning the bicycle onto the motor vehicle roof and then securing it for transport require lifting the bicycle from ground level to a height, in the bicycle carrying structure, equal to the resting area of the wheel, usually the front wheel, which is 20–30 cm above the motor vehicle roof.

This requires considerable efforts in loading and unloading operations with the associated risk that bicycle frame or pedals strike the car body, damaging it.

SUMMARY OF THE INVENTION

One of the advantages of the present invention is that it provides a device that makes bicycle loading and unloading operations easier, in addition to rendering these operations safer.

Another advantage of the invention is that it provides a device that can be easily applied to the already existing rack structures of the type comprising a pair of transverse carrier rails.

The above and other advantages are achieved by the device of the invention as described in the appended claims.

Further properties and advantages of the invention will better appear from the description of a preferred, but not exclusive, embodiment of the device shown as a not limiting example in the enclosed drawings.

DESCRIPTION OF PREFERRED EMBODIMENTS

Figure 1:
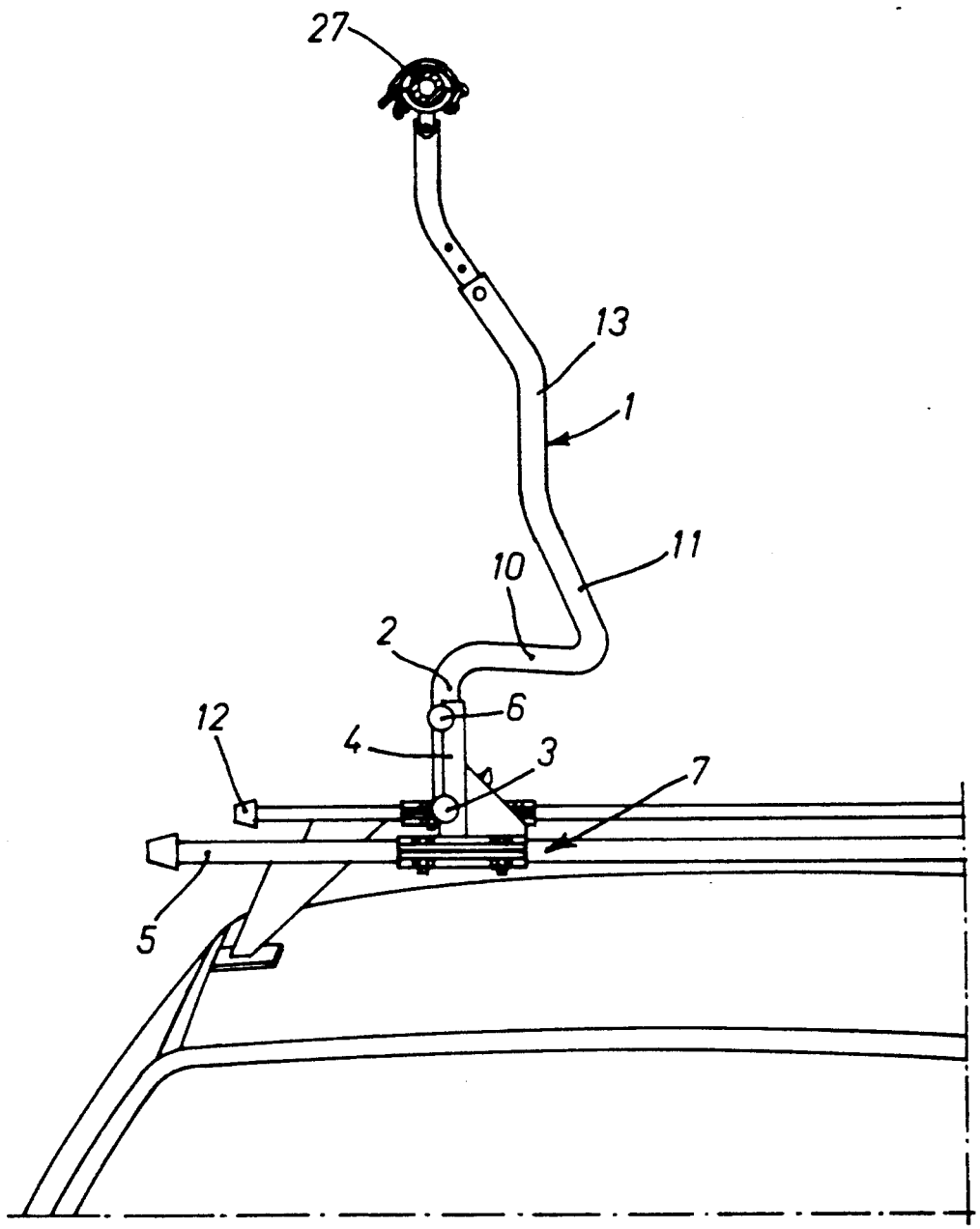
FIG. 1 is a perspective view of the components of a device according to the present invention, standing erect for the transport of a bicycle.
Figure 2:
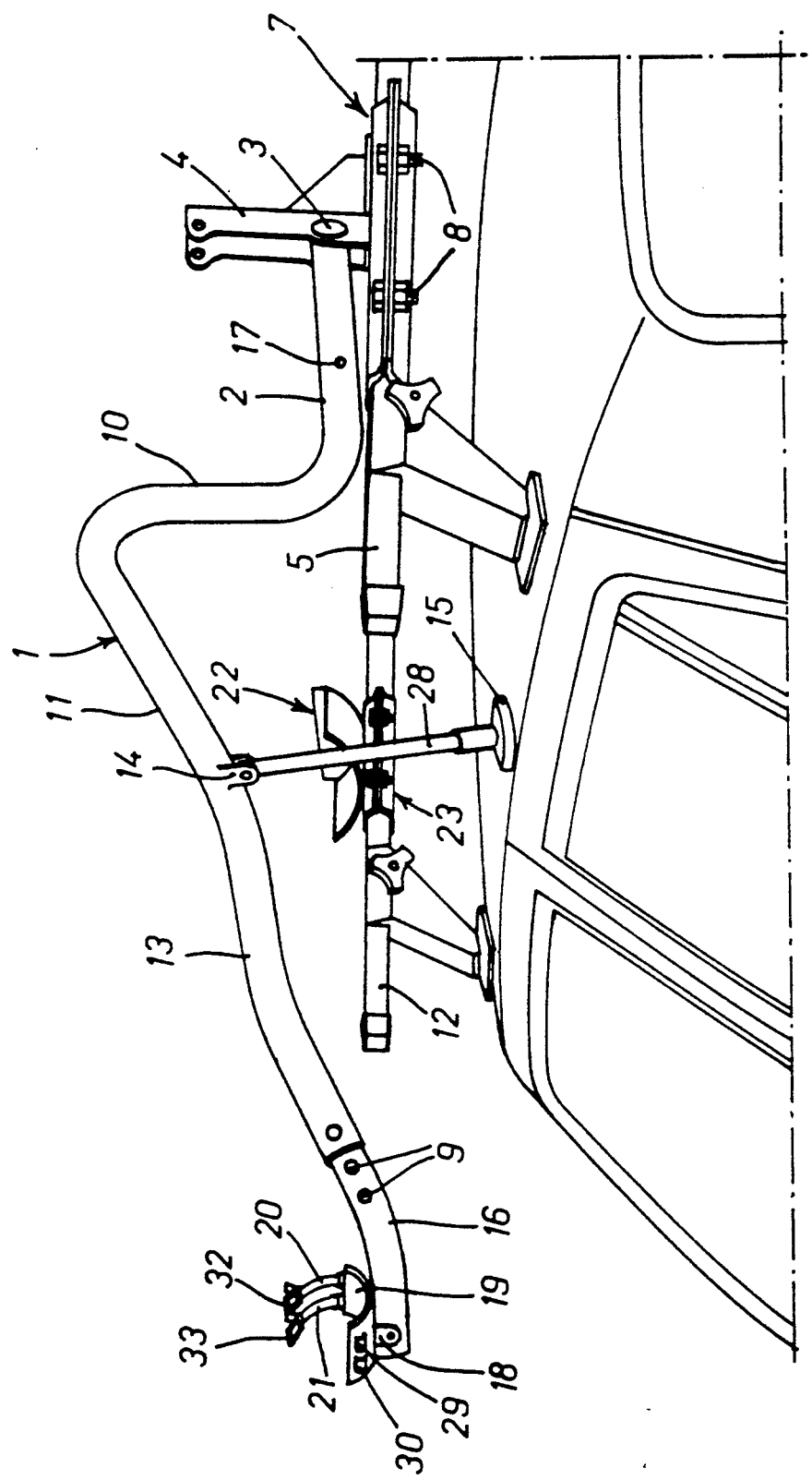
FIG. 2 is a perspective view of the components of a device according to the present invention, lowered for loading and unloading a bicycle.
Figure 3:
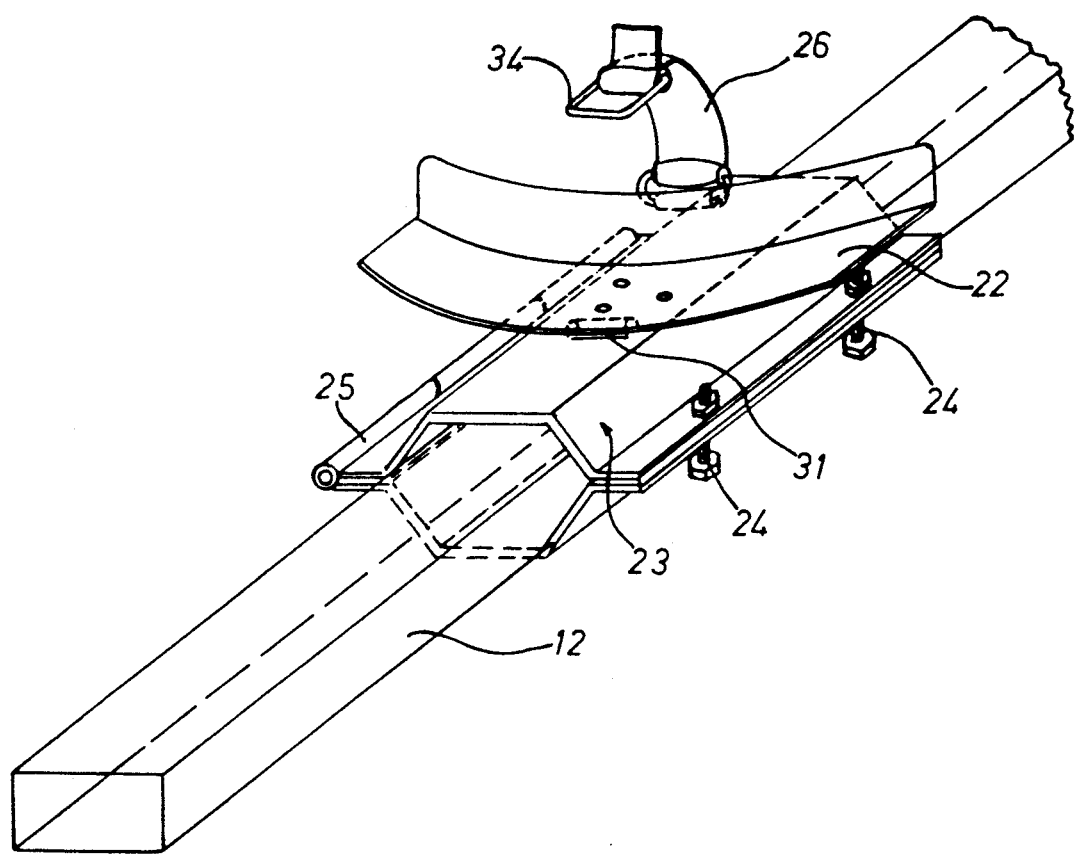
FIG. 3 is an enlarged view of the means for fastening the rest for the bicycle front wheel to one of the carrier rails.
Figure 4:
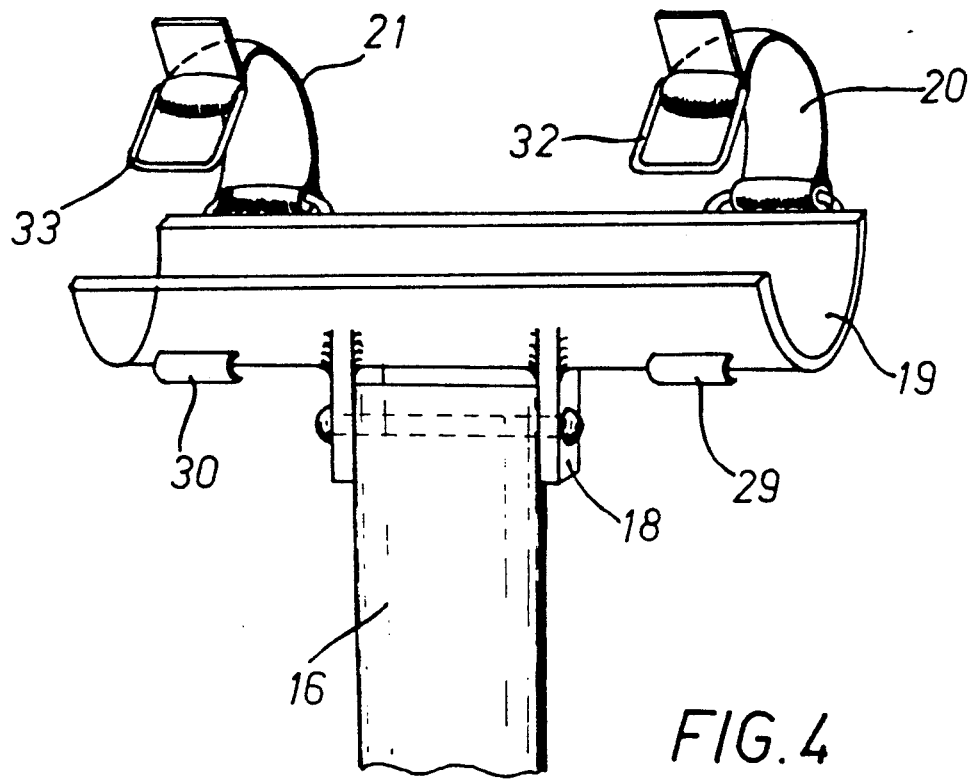
FIG. 4 is an enlarged view of the means for supporting the bicycle frame.

With reference to the attached Figures, the device of the invention comprises a tube 1 having a circular cross section and shaped in such a way as to longitudinally define four tube sections that extend successively at about 90° one from the other.

The tube 1 has a first section 2 rotatably connected through an extractable pass-through rotation pin (not shown) to the base of a hollow rest support 4 having a semicircular cross section, said pin being blocked by a knob 3 which is internally threaded and adapted to be manually rotated for the quick mounting and dismounting of the tube 1, when this is not used.

Said support 4 is mounted fastened to a shell member 7 having a hexagonal inner cross section and provided with a side hinge and tightening screws 8.

The shell member 7 is therefore adapted to be fastened to a first carrier rail of the structure for carrying articles provided on the motor vehicle roof.

Such rail can indifferently be either the front one 12 or the rear one 5 with respect to the advancing direction of the vehicle, in order to allow for the transport of two bicycles located side by side and in mutually opposed directions.

There is further provided an extractable fastening pin (not shown) passing through a hole 17 and parallel to the preceding rotation pin, for keeping in a vertical position the section 2 of the tube 1 at the end of the loading operation and during the transport of the bicycle.

A second internally threaded knob 6 is provided for firmly securing said fastening pin in the support 4.

A second section 10 of the tube 1 is provided, that is bent at about 90° with respect to the section 2, in such a way as to be parallel to the vehicle roof and facing the side opposite the one from which a bicycle is loaded, when the section 2 is in the vertical transport position.

A third section 11 of the tube 1 is further provided, that is bent at about 90° with respect to the section 10 in such a way as to be substantially parallel to the vehicle roof and facing the second carrier rail 12 of the structure for carrying articles that is mounted on the vehicle roof when the section 2 is in the vertical transport position.

A fourth section 13 of the tube 1 is provided, that is bent at about 90° with respect to the section 11 in such a way as to be substantially orthogonal to the vehicle roof when the section 2 is in the vertical transport position.

In other words, said fourth section 13 of the tube 1 results parallel to the first section 2.

The free end of this latter section 13 is lengthwise adjustable thanks to a telescopic extension 16 with parallel holes 9, sligthly bent upwards when the tube 1 is in the lowered position.

Such telescopic extension is retained within the tube section 13 by an extractable screw.

The free end of such telescopic extension 16 has a hole for receiving a pin which engages the brackets 18 of a hollow rest 19 having a semicircular cross section and being adapted to receive and hold the upper tube of the bicycle frame (27).

Releasable straps 20 and 21 of elastic material, equipped with anchoring hooks 32 and 33, are provided around the rest 19, on the external lower surface of which projections 29 and 30 are present for anchoring the hooks 32 and 33, in order to firmly secure the bicycle frame during the loading and unloading operations and the transport thereof.

There is further provided a rest member 22 for supporting and laterally holding the front wheel of the bicycle during the transport, which is fastended to the carrier rail 12 of the structure for carrying articles provided on the vehicle roof.

Such resting member 22 is mounted integral with and orthogonal to a shell member 23 having a hexagonal cross section and provided with a side hinge 25 and tightening screws 24.

An elastic strap 26 equipped with an anchoring hook 34 is provided around the resting member 22 and a projection 31 extends from the lower outer surface of the member 22 for anchoring the hook 34 in order to firmly secure the bicycle front wheel rim.

During the bicycle loading operation, the tube 1 is lowered towards the side of the vehicle from which the bicycle is to be loaded until it reaches a position in which the section 2 is rotated by about 90° from the vertical position that is assumed during the bicycle transport, whereas the end portion of the section 13 which carries the rest 19, after a rotation of about 90°, extends outside the vehicle outline in order to allow mounting the bicycle.

When the tube 1 is in the lowered position, the upper tube of the bicycle frame is located onto the rest 19 and the elastic straps 20 and 21 are secured to the projections 29 and 30 through the hooks 32 and 33.

The bicycle is then lifted towards the vehicle roof with the aid of the tube 1 acting as a guide for the path that the bicycle has to follow during this operation.

After the tube 1 has been lifted to transport position with the section 2 standing vertical, the fastening pin is inserted and tightened by screwing the knob 6 to firmly hold the tube 1 in the hollow support 4 during transport.

Finally, the front wheel of the bicycle is secured to the rest member 22 through the strap 26.

In order to unload the bicycle, the above described loading operations are executed in reverse order.

An extensible leg or stand 28 with an end rubber pad 15 is pivotally connected to the section 11 of the tube 1 through a supporting bracket 14 present on the portion facing the vehicle roof when the tube is in the lowered position, for resting against the vehicle roof when a heavy bicycle frame is to be secured to or disengaged from the rest 19.

When such extensible stand 28 does not act as a support for the tube 1, it is maintained against the tube 1 by a retaining spring (not shown) wound around the same rotation pin about which the stand is rotatable.

Figure 5:
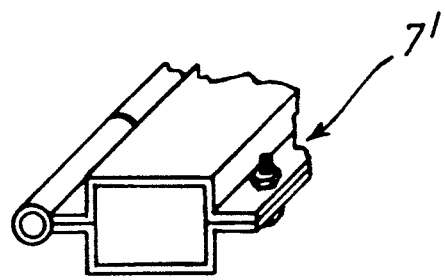
FIG. 5 is a perspective view of the fastening means to the carrier rail according to another embodiment of the present invention.

With reference to FIG. 5, a further embodiment is shown, in which the fastening hinged shell member 7' has a rectangular cross section.

Although the present invention has been described with reference to preferred embodiments, numerous modifications and rearrangements can be made, and still the result will come within the scope of the invention.

We claim:

1. A device for loading, unloading and carrying bicycles on the roof of motor vehicles, comprising:
   a pair of carrier rails;
   a hollow rest support adapted to be orthogonally fastened to a first one of said carrier rails in a position perpendicular to the roof of a vehicle;
   a pin passing through said hollow rest support in a direction parallel to a direction of elongation of the vehicle;
   a tube including four tube sections defined longitudinally of the tube and extending successively at about 90° one relative to the other, said tube being rotatably connected at one end thereof to said pin so as to rotate by at least 90° from an upright position to a collapsed position in a plane which is substantially orthogonal to the elongation of the vehicle wherein a free end of said tube protrudes in said collapsed position outwardly from the roof of the vehicle.

2. A device as claimed in claim 1, wherein, in the transport position, said tube has a first one of said sections orthogonal to the motor vehicle roof, a second one of said sections parallel to the motor vehicle roof and facing the opposite side of the vehicle from which a bicycle is loaded, a third one of said sections substantially parallel to the motor vehicle roof and facing a second one of said carrier rails, and a fourth one of said sections substantially parallel to the first one of said sections.

3. A device as claimed in claim 2, wherein said fourth section is provided with a telescopic extension, said telescopic extension allowing changing the distance of the fastening point of the bicycle frame from said carrier rails provided on the motor vehicle roof.

4. A device as claimed in claim 3, wherein, at the free end of said telescopic extension, there is rotatably mounted a support adapted to receive one of said tubes of the bicycle frame, said support being further provided with elastic means and hooks for securing said tube of the bicycle frame to the motor vehicle roof, during lifting, lowering and transport operations.

5. A device as claimed in claim 4, wherein said support rotatably mounted on said telescopic extension comprises a hollow member having a semicircular cross section.

6. A device as claimed in claim 1, wherein, in the loading or unloading positions, said tube has a first one of said sections parallel to the motor vehicle roof and facing the side of the motor vehicle from which a bicycle is loaded, a second one of said sections orthogonal to the motor vehicle roof and facing upwards, a third one of said sections substantially parallel to the motor vehicle roof and facing a second one of said carrier rails, and a fourth one of said sections substantially parallel to the first one of said sections.

7. A device as claimed in claim 1, further comprising a rest member for the front wheel and fastening means, said rest being mounted, through said fastening means and orthogonally with respect to one of said carrier rails, on the motor vehicle roof.

8. A device as claimed in claim 7, wherein said fastening means for mounting said rest member and said hollow rest support comprise shell members having a rectangular cross section and provided with a side hinge and tightening screws.

* * * * *